United States Patent [19]

Tekirdaglis

[11] Patent Number: 4,498,002
[45] Date of Patent: Feb. 5, 1985

[54] PHOTOELECTRIC INSTRUMENT FOR OBSERVING A VIEWING CORRIDER OF INTEREST

[76] Inventor: Aris Tekirdaglis, 1231 W. Grant Ave., Wilmington, Calif. 90744

[21] Appl. No.: 374,335

[22] Filed: May 3, 1982

[51] Int. Cl.³ .......................... G01V 9/04; G08B 13/18
[52] U.S. Cl. ...................................... 250/221; 340/555
[58] Field of Search ...................... 250/221, 222.1, 239; 340/555; 358/105

[56] References Cited

U.S. PATENT DOCUMENTS

| 3,309,689 | 3/1967 | Keeney | 340/555 |
|---|---|---|---|
| 3,718,822 | 2/1973 | Pascue | 250/222.1 |
| 3,789,384 | 1/1974 | Akers | 250/221 |
| 3,932,746 | 1/1976 | Swanson | 250/221 |

OTHER PUBLICATIONS

*Field Disturbance Sensing Unit,* vol. 18, No. 7, pp. 2275–2276, 12/1975, IBM Tech. Disclosure Bulletin, K. E. Powell.

*Primary Examiner*—David C. Nelms
*Assistant Examiner*—Ernest Austin, II
*Attorney, Agent, or Firm*—Charles H. Thomas

[57] ABSTRACT

A photoelectric instrument detects dissimilar variations in a viewing corridor and provides an alarm signal responsive to such changes. A lens, such as a camera lens, is mounted on a case and separate photoelectric sensors are adjustably positioned in the focal plane of the lens within the case. The photoelectric sensors are moved relative to each other to define a viewing corridor of interest. The photoelectric sensors are coupled to a differential amplification network and the inputs to the amplification network are adjusted to produce a reference signal. Deviations of the differential amplification network output from the reference signal indicate an intrusion or non-uniform alteration of the field of view, which results in an alarm signal.

12 Claims, 8 Drawing Figures

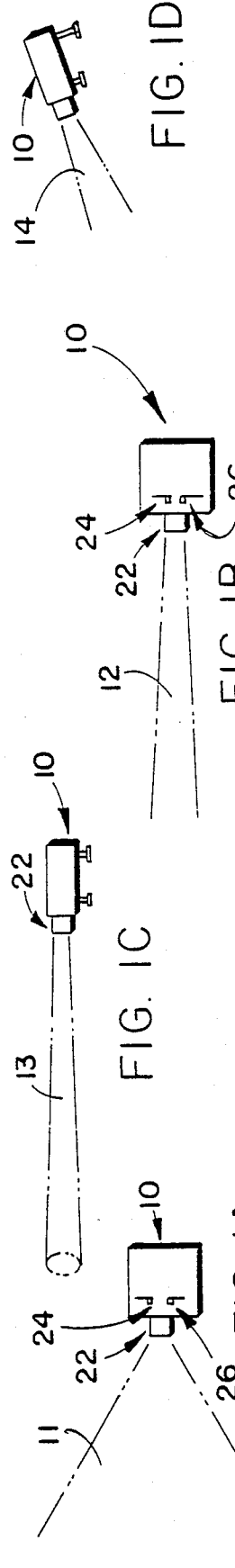
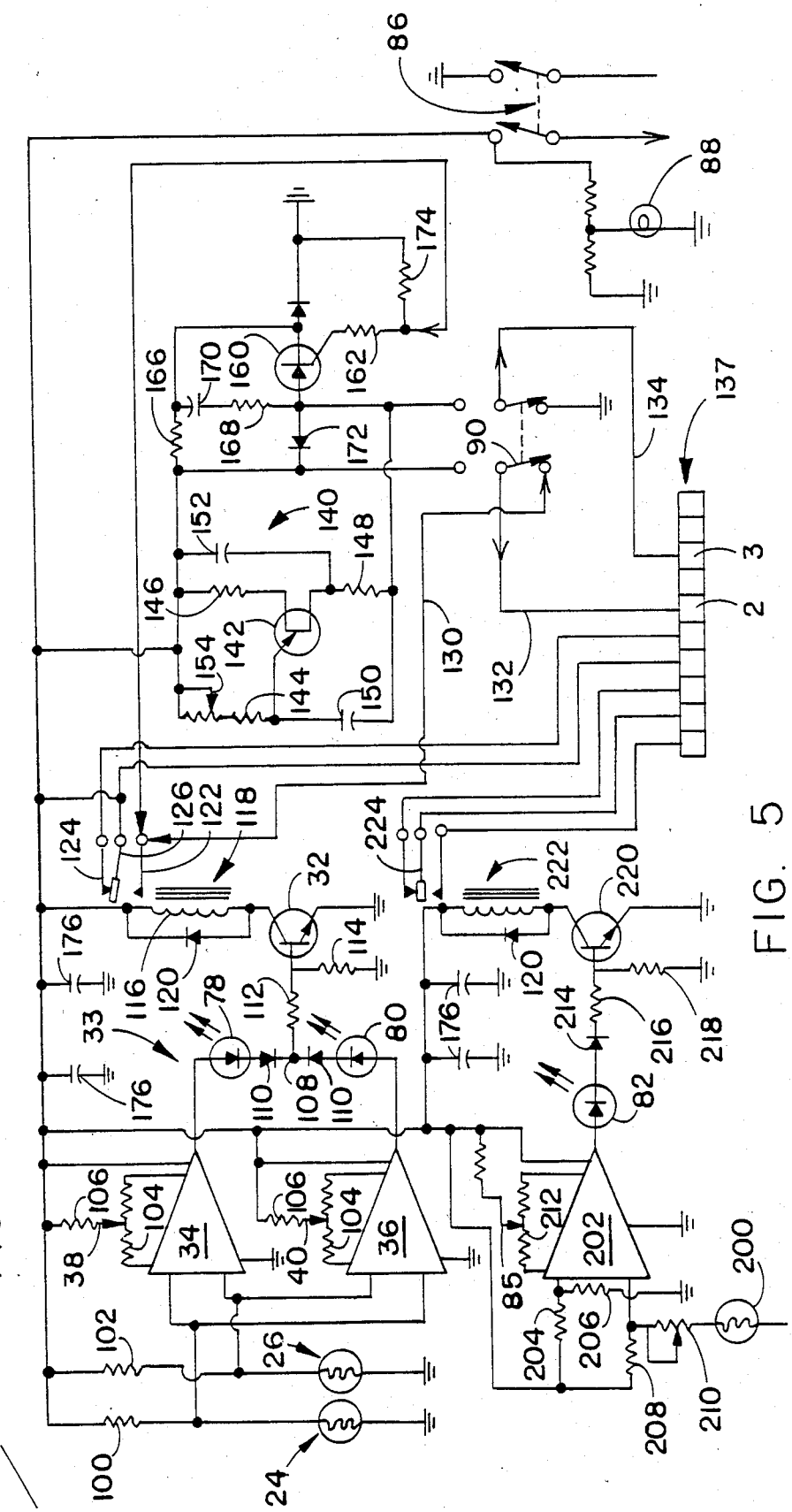

PHOTOELECTRIC INSTRUMENT FOR OBSERVING A VIEWING CORRIDER OF INTEREST

BACKGROUND OF THE INVENTION

1. Field of the Invention

The present invention relates to photoelectric instruments used to monitor a field of view and to detect non-uniform intrusions into the field of view.

2. Description of the Prior Art

There are numerous applications for photoelectric devices which monitor a field of view and which provide signals indicative of movement within the field of view. For example, video cameras are used to provide unmanned surveillance of areas for security purposes. Photosensors are used to detect the approach of containers in cargo loading and unloading systems and to detect the movement of material into position to be processed, such as, for example, in a wood cutting or milling operation. Photoelectric sensors are also utilized to control the operation of elevator doors, burglar alarms, conveyor belts and in other applications where an automatic signal is required in response to movement within a field of view.

Heretofore, very sophisticated instruments have been required to view all but the shortest fields of view. Simple photoelectric cells have heretofore been useful for area surveillance only at a range of a few feet, and only where uniform ambient light conditions exist. While video cameras are useful in conducting area surveillance, they must be manually monitored either directly, or by means of video tape, in order to detect the occurrence of events of interest. The cost of video cameras is such that often times the expense of a video camera system is not warranted by the task to be performed. Less sophisticated area surveillance systems, on the other hand, require a highly collimated light source at a short distance in order to be able to discern movement or protrusion of an obstacle into a field of view.

SUMMARY OF THE INVENTION

The present invention provides an instrument for detecting changes in a viewing area of interest. The instrument of the invention is sensitive to dissimilar changes across its field of view even at a very great distance. Furthermore, the construction of the system of the invention is such that an extremely long, narrow viewing corridor can be defined, without the necessity for a video camera or any other such sophisticated viewing device.

According the present invention a hollow, enclosed case is provided with a lens mounted thereon. The lens is of reasonably good quality and may, for example, be a camera lens. Suitably lens systems are utilized on commercially available 35 mm slide cameras. Within the case of the instrument of the invention, at least two photocells or other photo detectors are adjustably positioned in the lens focal plane and are moveable transversly relative to the direction of image projection through the lens. The photosensors are coupled as inputs to a differential amplifying circuit. A means is provided to define a reference output from the differential amplifying circuit and the differential amplifying circuit is connected to a signaling means which is responsive to changes in the output from the differential amplification circuit. Various surveillance instruments according to the invention can be utilized to define a corridor of interest which may vary considerably in length and in width. With a preferred embodiment of the invention a viewing corridor can be defined as narrow as about 6 inches in width at a distance of 100 feet and as wide as 15 feet at a distance of 20 feet from the lens.

The instrument of the invention may be used in a wide variety of applications. One area of application is in connection with the movement of cranes and other machines at a cargo loading terminal, such as a shipping dock. When cargo is unloaded from seagoing vessels, it is typically stacked in rows separated by long, narrow corridors, typically about 3 or 4 feet in width. Cargo manipulating devices such as cranes and forklifts travel the narrow corridors and are used to manipulate the cargo. However, occasionally an isolated unit of cargo is improperly stacked so as to project into the narrow corridor. This prevents cranes and forklifts from traveling through a corridor, even though the projecting portion of the improperly stacked cargo extends only a few inches into the corridor. In conventional practice, the inability of a machine to pass through the corridor is discovered only after the crane or other machine has advanced along the corridor and encounters the projecting cargo. It is then necessary for the operator to back up the machine the entire distance that it has advanced in the corridor and attempt to gain access to the desired object by some other route.

The instrument of the present invention can be mounted on a crane, forklift or other cargo moving device. The instrument can be adjusted so that intrusions into the viewing area of interest are immediately indicated before the crane or other machine enters the corridor between the stacks of cargo on either side. The lens of the instrument will project an image of the corridor into the instrument case. Separate photoelectric sensors positioned on either side of the center line of the lens will respond to the light level of the portion of the projected image impingent thereon. Any differences in light level, such as occur as a result of cargo projecting into the viewing corridor from one side and not from the other, will trigger an alarm. Also, an alarm will be triggered if there is an increase in light level on one, but not the other, of the photoelectric sensors. The headlight from a truck shining unevenly on the photoelectric sensors would have this result. An adjustment of the transverse distance of each photoelectric sensor from the center line of the lens will determine the width and configuration of the viewing corridor or field of view. The instrument will detect both the static presence or obstruction on one side of the field of view and not the other, and will also signal the entry of a mobile object, such as another machine, into the field of view.

The photoelectric viewing device of the invention may be used in other applications as well. For example, in an automated lumber cutting or milling operation the detection instrument can be positioned to sense any departure from a prescribed length or width of stock to be processed. Also, the instrument can be used as a counting device, for example, to count passing vehicles in a traffic control tabulation. The instrument can be mounted on the rear of a vehicle so as to provide a warning whenever a following vehicle approaches too closely. Thus, a driver is warned of a vehicle tailgating behind him. The instrument of the invention can also be used as a proximity indicating device, as well as in a burglar alarm. Many other applications of the device are also possible whereever an alarm is desired to signal the differential in light level on either side of a field of view.

Because the invention operates on the basis of different light levels on either side of a field of view, it is insensitive to ambient conditions for which no alarm signal is desired. For example, the instrument of the invention will not be affected by changing light levels which affect both sides of a field of view equally. Therefore, passing clouds and approaching darkness will not erroneously trigger an alarm. An alarm will only be sounded when the light level focused upon the separated photoelectric sensors in the instrument case is different.

In a preferred embodiment of the invention, the instrument is also equipped with a threshold discriminator. In order for an electrical signal differential from the photoelectric sensors to reach a sufficient magnitude to trigger an alarm, the ambient light level must achieve a certain minimum threshold. If the ambient light level is below this threshold, a signal differential between the photoelectric sensors will be of insufficient magnitude to trigger the alarm circuitry. Therefore, a threshold discriminator circuit provides an output which illuminates an LED, for example, to signify when an ambient light level is insufficient. The threshold discriminator circuit may have a relay connected to another alarm or to an indicator. The indicator may be conditioned to signal either sufficient, or insufficient light, as desired. The threshold discriminator circuit may be arranged to indicate when the ambient light level has dropped to a level inadequate to produce a reliable output from the differential amplification network coupled to the separated photoelectric sensors. The threshold discriminator relay can also be connected to trigger an auxiliary light so that the photoelectric viewing device of the invention is again operable. Preferably, the threshold discriminator is adjusted to accommodate different areas of application and the sensitivities of different components of devices constructing according to the invention.

Preferably also, there is a selector controlling the nature of an alarm signal. That is, the instrument can be preferably operated in at least two modes. In one mode, the timer circuit holds an alarm signal on for a predetermined period of time. This time interval may be adjusted from an instantaneous signal to a duration of up to nine hours in a preferred embodiment of the invention. Alternatively, unequal illumination of the separated photoelectric sensors may produce an alarm signal which is continuous and which is terminated only by resetting the instrument.

The effective length of the viewing area or corridor can also be adjusted with the instrument of the invention. To obtain the maximum distance of the field of view, the instrument is mounted upright so that the center line of the lens lies along a horizontal axis. The distance of the viewing corridor is then determined by the visibility distance in the environment in which the instrument is used. To reduce the length of the viewing corridor, the instrument of the invention is tilted down, so that the center line of the lens passes through the floor or ground in the area where the instrument is used. The degree to which the instrument is tilted determines the length of the field of view.

The invention may be described with greater clarity and particularity by reference to the accompanying drawings.

DESCRIPTION OF THE DRAWINGS

FIG. 1A is a diagrammatic plan view illustrating the photoelectric detection device adjusted for a wide field of view.

FIG. 1B is a diagrammatic plan view illustrating adjustment of the photoelectric device for a narrow field of view.

FIG. 1C is a diagrammatic elevational view illustrating adjustment of the photoelectric device for a long field of view.

FIG. 1D is a diagrammatic elevational view illustrating adjustment of the photoelectric device for short field of view.

FIG. 5 is an electrical schematic diagram of the embodiment of the invention depicted.

DESCRIPTION OF THE EMBODIMENT

Figure 2:
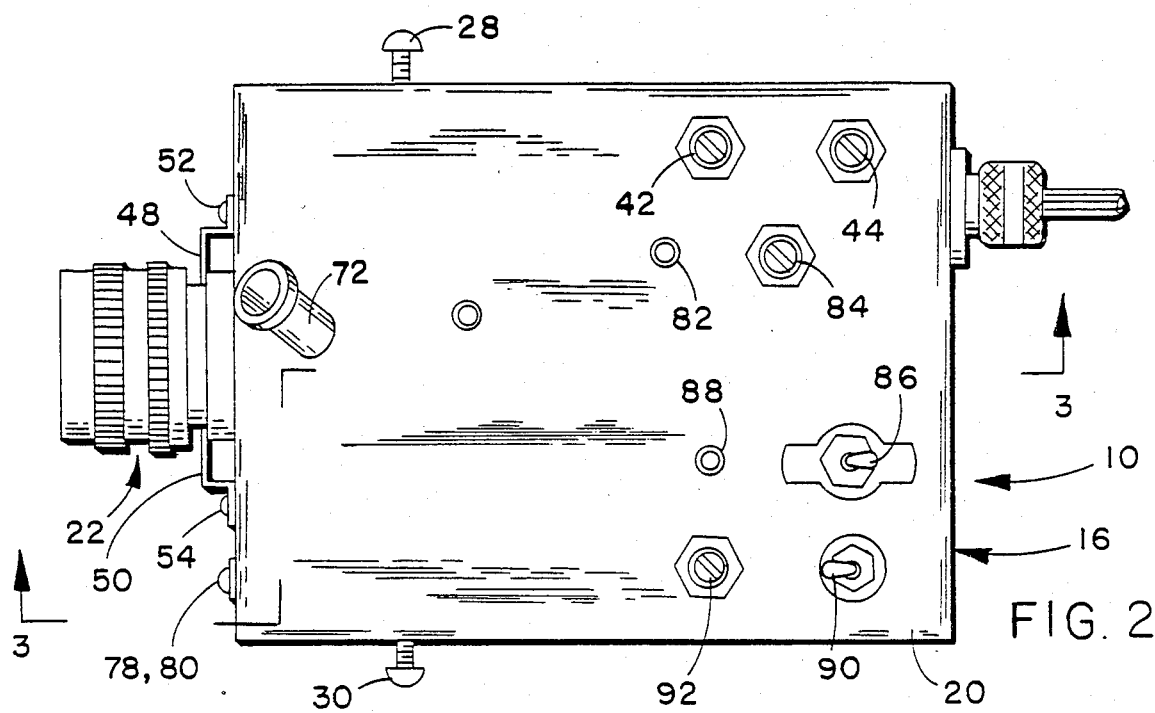
FIG. 2 is a plan view of the top of an embodiment of the instrument of the invention.
Figure 4:
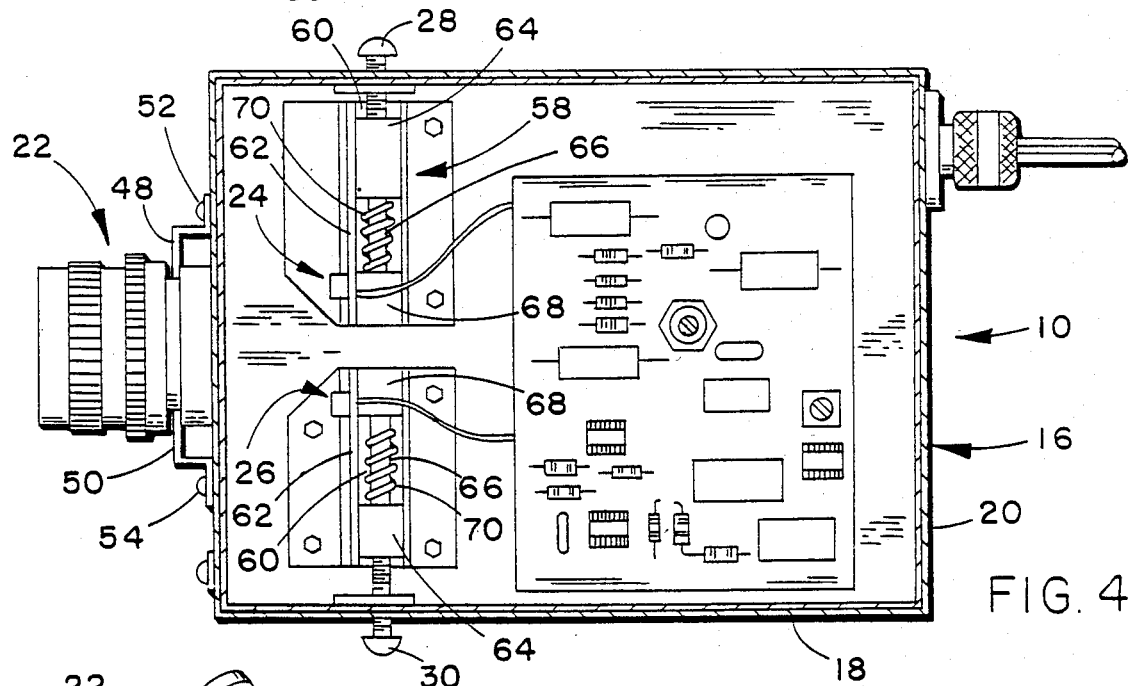
FIG. 4 is sectional plan view taken along the lines 4—4 of FIG. 3.
Figure 3:
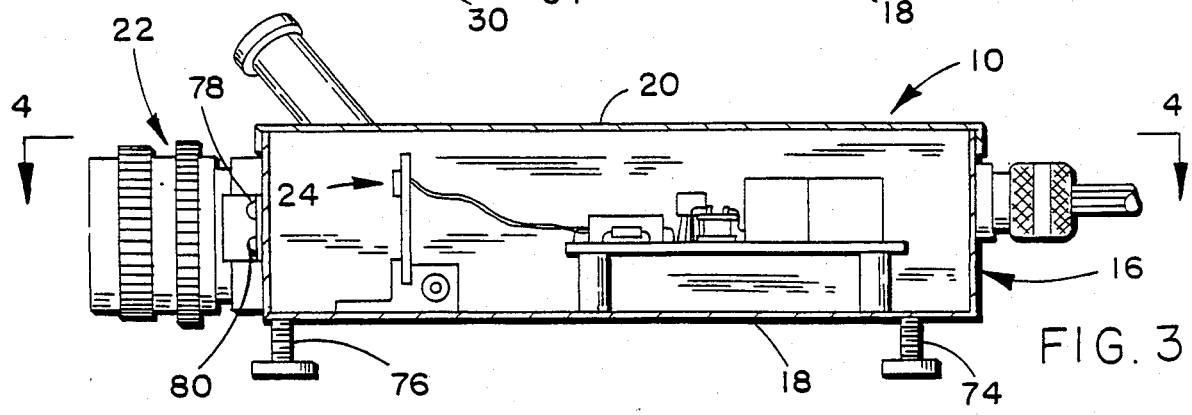
FIG. 3 is a sectional elevational view taken along the lines 3—3 of FIG. 2.

FIGS. 2–4 illustrate a photoelectric device or instrument 10 for defining a viewing corridor or area of interest designated as 11, 12, 13 and 14 in FIGS. 1A through 1D, respectively. The photoelectric device 10 includes an optically shielded, box-like case 16, which includes a tray-like portion 18 and a lid 20. A lens assembly 22 is mounted on the upright front wall of the case 16 to project an image into the case 16. The lens 22 views an area including the area of interest. A pair of photoelectric sensors 24 and 26 are located in the case 16. Threaded adjustment screws 28 and 30, projecting outside of the case 16 from the upright walls thereof are used to position the photoelectric sensors 24 and 26 in the case 16 in a plane transverse to the direction of image projection from the lens assembly 22, as depicted in FIGS. 3 and 4.

As illustrated in FIG. 5, a differential amplification network 33 is coupled to the photoelectric sensors 24 and 26. The differential amplification network 33 provides an output responsive to an input differential between the photoelectric sensors 24 and 26. Adjustment means, in the form of adjustable resistor pots 38 and 40, are coupled to normalize the input to the differential amplification transistor 32. The adjustable resistor pots 38 and 40 are operable from outside of the case 16 by means of slotted, threaded adjustment posts 42 and 44 depicted in FIG. 2. The signaling device, in the form of a horn or a buzzer connected to terminal block junction 2 and 3 of terminal block 37 in FIG. 5, signals changes in the output of the photoelectric sensors 24 and 26.

The lens assembly 22 is secured to the front wall of the tray 18 of the case 16 by means of mounting brackets 48 and 50 which are fastened by screws 52 and 54 to center the lens assembly 22. The lens assembly 22 projects an image through an aperture in the front wall of the case 16.

The lens assembly 22 should be a reasonably good quality lens. One suitable lens is a 50 mm, 1:1.9 Auto Yashinon-DS lens manufactured by Yashica of Japan. If the distance from the lens assembly 22 to the separate photoelectric sensors 24 and 26 is maintained at a distance approximately equal to the focal length in a conventional camera, a wide variety of camera lenses may be employed in the photoelectric instrument 10.

Within the case 16 there is a track 58 defined by transversely aligned and separated channel sections 60. The channel sections 60 extend to either side of the center line of the lens assembly 22 and are secured by screws to the bottom of the tray section 18 of the case 16. Within each channel section 60 there is a flat, light screen 62 disposed in an upright orientation facing the front wall of the case 16. A rectangular prism shaped traveler block 64 is glued to the backside of each screen 62. The adjustment screws 28 and 30 are longitudinally restrained and rotate within bushings in the opposite walls of the case 16. The shanks of the adjustment screws 28 and 30 are threadably engaged with the traveler blocks 64 to form a worm drive therewith. The traveler blocks 64 thereby move along the channel sections 60, each traveler block 64 carrying its associated screen 62 in a transversely reciprocal fashion. From the ends of the traveler blocks 64 facing each other there are plungers 66 which move reciprocally through positioning blocks 68 that are secured to the channel sections 60. Coil springs 70 are disposed about the plungers 66 to aid in maintaining the screens 62 in proper reciprocal alignment in the channel sections 60. Each of the photoelectric sensors 24 and 26 is mounted upon a separate one of the screens 62 and is independently and laterally moveable in the focal plane of the lens assembly 22 by means of the adjustment screws 28 and 30, respectively.

In order to facilitate observation of the field of view, an eyepiece 72 may be mounted in the lid 20, as illustrated in FIGS. 2 and 3. The eyepiece 72 is directed at an angle at the focal plane of the lens assembly 22, so that an observer, peering through the eyepiece 72, can see the marginal portions of the field of view which are projected onto the screens 62. By movement of the adjustment screws 28 and 30, an observer can position the photoelectric sensors 24 and 26 at the desired positions in the field of view to thereby define a viewing area of interest which is bounded by the photoelectric sensors 24 and 26. Observation through the eyepiece 72 allows a user to visually ascertain the boundaries of the viewing corridor and to adjust those boundaries as desired.

The adjustment screws 28 and 30 serve as means for varying the lateral positions and spacing of the photoelectric sensors 24 and 26. By turning the adjustment screws 28 and 30 to move the guide blocks 64 away from each other, the distance between the photoelectric sensors 24 and 26 is increased, thereby increasing the viewing corridor in the manner depicted in FIG. 1A. That is, obstructions or intrusions into a relatively wide viewing corridor 11 will affect the photoelectric sensors 24 and 26 dissimilarly, and thereby generate an alarm signal when the intrusion or obstruction is relatively far from the center line of the lens assembly 22.

Conversely, when the adjustment screws 28 and 30 are turned in the opposite directions to drive the traveler blocks 64 toward each other, the spacing between the photoelectric sensors 24 and 26 is decreased. The photoelectric sensors 24 and 26 are thereby moved toward the center of the image projected onto the screens 62 so that a relatively narrow viewing corridor 12 is defined, as depicted in FIG. 1B. An obstruction or intrusion into the viewing corridor 12 will not generate an alarm signal until it is very close to the alignment of the lens assembly 12. The appropriate width of the viewing corridor is determined by the user, using the adjustment screws 28 and 30, depending upon the width of the viewing corridor in which he is interested. Variations in illumination intensity in the portion of the image projected onto the screens 62 beyond the viewing corridor of interest will not generate any alarm signal, while penetration of the viewing corridor by an object from one side or the other will change the illumination level of one of the photoelectric sensors 24 or 26, but not the other. As a result, there will be a difference in output from the photoelectric sensors 24 and 26 and the resultant generation of an alarm signal.

The length of the field of view may also be varied, as illustrated in FIGS. 1C and 1D. As illustrated in FIG. 3, the case 16 is mounted upon a pair of upright legs 74 on either side of the tray 18 at the rear of the case, and by a single, central threaded adjusting foot 76 near the front of the case. When the adjustment foot 76 is advanced so that it is the same length as the rear legs 74, the axis of the lens assembly 22 is horizontal and the instrument 10 has a maximum viewing range 13 as depicted in FIG. 1C. To reduce the viewing range so as to prevent events beyond the desired range from affecting the photoelectric sensors 24 and 26, the threaded shank of the adjustment foot 76 is screwed into the case 16, thereby reducing the length of the adjustment foot 76, as depicted in FIG. 1D. In this manner, the length of the field or corridor of interest 14 can be markedly reduced, as illustrated in FIG. 1D. The adjustment foot 76 thereby forms a means for tilting and adjusting the longitudinal orientation of the lens assembly 22 to vary the length of the viewing corridor.

Various other indicators and controls also appear on the instrument 10. An LED 78, depicted in FIGS. 3 and 5, will be illuminated when an object or obstruction first enters the field of view from the left of the instrument 10. Conversely, an LED 80 will be illuminated when an object or obstruction first enters the field of view from the right. The LED's 78 and 80 thereby form a photosensor change indicator means. The LED's 78 and 80 are operable, as will hereinafter be described, to identify the photoelectric sensor 24 or 26 which first departs from a reference condition.

Another LED indicator 82 is positioned on the lid 20 of the case 16. The LED indicator 82 is illuminated by a threshold detection circuit, which will hereinafter be described. Illumination of the LED 82 indicates that at least a minimum allowable level of ambient light exists in the vicinity of the instrument 10. In the absence of illumination of the indicator 82, a light level differential could exist in the portions of the image projected onto the photoelectric sensors 24 and 26, but the absolute level of illumination would be so low that the resultant differential signal would be insufficient to generate an alarm. Accordingly, the user is informed by illumination of the indicator 82 that a sufficient ambient light level exists for proper operation of the instrument 10. The threshold of the threshold discriminator at which illumination of the indicator 82 will occur may be varied by means of a slotted resistor post 84, depicted in FIG. 2, which adjusts the resistor pot 85 of FIG. 5.

A toggle switch 86 is also located in the lid 20. The toggle switch 86 is operated to supply power to the photoelectric device 10. An LED 88 is illuminated when the power switch 86 is turned on.

Another toggle switch 90 is provided as a mode selection switch. The toggle switch 90 is operable from atop the lid 20 of the case 16 and is coupled to a timing circuit, hereinafter described, to selectively enable and disable the timing circuit. When the timing circuit is enabled, a signal is provided to the alarm indicator for a predetermined time period upon departure of the differential amplification network 33 from a reference output, normally a null or zero output. Upon elapse of the time interval, the alarm indicator is released. The time interval can be adjusted from an instantaneous signal to a signal of a duration of up to nine hours by means of the slotted resistor post 92 depicted in FIG. 2. When the mode selection 90 is operated in the opposite direction to select a continuous mode of operation, the alarm idicator output, once activated by either the photoelectric sensor 24 or 26, will not be extinquished until the instrument 10 is reset.

The electrical circuitry of the photoelectric device 10 is illustrated schematically in FIG. 5. The photoelectric sensors 24 and 26 are coupled through 1K ohm resistors 100 and 102, respectively, to a positive 12 volt power supply through the power switch 86. The photoelectric sensors 24 and 26 are photoresistance cells having a resistance of between 300 ohms and 40K ohms, depending upon the intensity of illumination impingent thereon. The photo cells 24 and 26 are each coupled to opposing inputs of IC amplifiers 34 and 36. The outputs of amplifiers 34 and 36 are adjusted by means of the resistance pot wipers 38 and 40, as previously described. The resistors 104 are 5K ohm linear taper resistance pots. The resistors 106 preferably have a value of 33K ohms.

As previously noted, the wipers 38 and 40 are moved by slotted resistor pot adjustment posts 42 and 44, respectively, located on the lid 20 of the case 16. In the use of the invention the wipers 38 and 40 are adjusted once the photoelectric instrument 10 has been positioned to view the area of interest and once the lens assembly 22 has been adjusted and the photoelectric sensors 24 and 26 laterally positioned and spaced by means of the independently adjustable screws 28 and 30. Thereupon, the wipers 38 and 40 are moved so that the amplifiers 34 and 36 both produce a zero or null output.

The amplifiers 34 and 36 serve as a differential amplification means. Both of the amplifiers 34 and 36 provide an output responsive to an input differential between the photoelectric sensors 24 and 26. The polarity of the outputs from the differential amplifiers 34 and 36 are in opposition to each other. That is, if the voltage between the resistor 100 and the photoresistance cell 24 is higher than the voltage between the resistor 102 and the photoresistance cell 26, the differential amplifier 34 will produce a positive output to illuminate the optical indicator 78 on the front of the case 16. Conversely, where the voltage between the resistor 102 and the photoelectric sensor 26 rises above the voltage between the resistor 100 and the photoelectric sensor 24, the output of the differential amplifier 34 will be negative and that of the amplifier 36 will be positive, thereby illuminating the light 80 on the front of the case 16. Accordingly, it is important to adjust the wipers 38 and 40 prior to use of the photoelectric device 10 so that under ambient conditions both of the amplifiers 34 and 36 produce a null or zero reference output. Neither of the photodiodes 78 or 80 will then be illuminated unless the photoresistance cells 24 and 26 are thereafter exposed to different light levels.

The outputs of the differential amplifiers 34 and 36 are directed to a summing node 108 through Model 1N914 diodes 110, as indicated.

From the summing node 108, any voltage potential is applied to a 2.2K ohm resistor 112 to the differential amplification transistor 32. The differential amplification transistor 32 is preferably a Model 2N2222 transistor. The base of the transistor 32 is coupled to ground through a 4.7K ohm resistor 114. The emitter of the transistor 32 is also coupled to ground and the collector thereof is connected to the 12-volt positive power supply through the coil 116 of a relay 118. A rectifying diode 120 is coupled across the coil 116. The diode 120 is preferably a Model 1N4001 diode.

The relay 118 is actuated whenever a sufficient forward bias exists on the base of the transistor 32. This will occur whenever either one of the LEDs 78 or 80 is illuminated. When the relay 118 is actuated, the normally open contact 122 will be closed and the normally closed contact 124 will be opened. When the relay 118 is actuated, the positive 12-volt power supply is applied through the armature relay 126 to the normally open contact 122.

If the mode selection switch 90 is in the continuous mode, as depicted in FIG. 5, power will be supplied to a load through a terminal block 37. That is, the positive 12-volt supply will be provided through the armature 126 and normally open contact 122, through line 130 and through the contact of the switch 90 to line 132 and then to the load connected to junction 2 of the terminal block. A return path is established to ground through junction 3 of the terminal block and through line 134 to the other contact of the switch 90. The load may, for example, be of an audible alarm or an indicator.

With the switch 90 in the continuous mode of operation, the load connected to terminal junctions 2 and 3 will remain actuated only as long as the relay 118 is actuated. The relay 118 will be actuated only as long as the photoelectric sensors 24 and 26 are subjected to different light levels. Thus, the duration of actuation of the load connected to terminal junctions 2 and 3 is determined by the duration of the presence of an obstacle or intrusion into the field of view of the instrument 10. In this mode of operation the contacts of the signaling relay 118 are coupled directly to the load connected to the terminal block junctions 2 and 3.

When the switch 90 is in the timed mode of operation, opposite to that depicted in FIG. 5, a timing circuit 140 is brought into operation. The switch 90 serves to selectively enable and disable the timing circuit 140.

The timing circuit 140 includes a unijunction transistor 142, a resistor pot 144, resistors 146 and 148, and capacitors 150 and 152. The wiper 154 of the resistor pot 144 is controlled by the slotted resistance pot adjuster 92 on the lid 20, depicted in FIG. 2. Before the relay 118 is actuated, the SCR 160 is not conducting and no power is applied to the timing circuit 140. When the relay 118 is actuated, however, the positive voltage supply is conducted from the relay armature 126 through the normally open contact 122 and through resistor 162 to the gate of the SCR 160, thereby turning on the SCR 160. Once the SCR 160 is turned on, power is not only supplied to the alarm indicating device connected across terminals 2 and 3 in the terminal block 37, but also to the timing circuit 140. In the timing circuit 140 the capacitor 150 starts to charge through resistor 144. When the voltage across the capacitor 150 becomes great enough, the unijunction transistor 142 will fire, causing a surge of current through the resistor 148. This will increase the voltage drop across resistor 148. The voltage at the output of the unijunction transistor 142 cannot change instantly because the voltage across capacitor 152 cannot change instantaneously. The voltage at the cathode of the SCR 160 cannot change because it is connected to ground. The only way that this increase in voltage across resistor 148 can exist is if the voltage at the anode of the SCR 160 decreases. This, indeed, is what happens. The anode voltage actually goes to zero briefly, just long enough to interrupt the current flowing through SCR 160. This interruption is sufficient to turn off the SCR. Unless the relay 18 is still actuated, the SCR 160 will not turn on again. Unless SCR 160 is turned on, no current can flow through the alarm indicating device connected across terminal junctions 2 and 3.

The resistors 166 and 168 and the capacitor 170 are coupled to the SCR 160 as indicated in FIG. 5 to prevent false triggering of the SCR 160. The blocking diode 172 is provided to prevent an inductive surge through the SCR 160 when the load of the alarm signaling device connected across junctions 2 and 3 is terminated. The resistor 174 stabilizes the gate of SCR 160 at a triggering level above ground when the normally open relay contact 122 is closed. Capacitors 176 stabilize the positive power supply in the system.

The photoelectric device 10 also includes a light threshold detecting circuit. The light threshold detecting circuit includes a photoresistance cell 200 and another integrated circuit 202, which serves as a differential amplifier. The differential amplifier 202 receives one input from the positive power supply through a resistor 204. Another resistor 206 couples that input to ground in a voltage dividing network. The other input to the differential amplifier 202 is connected to resistors 208 and a variable resistor 210 to the photoelectric sensor 200. As previously noted, the slotted resistor pot adjuster 84 is coupled to the wiper 85 which varies the resistance of a linear resistor pot 212.

Unless ambient light conditions are sufficient to raise the resistance of the photoelectric sensor 200, the differential amplifier 202 will provide an insufficient output to illuminate the LED 82. Once such a sufficient output is achieved, however, the output of differential amplifier 202 acts through the LED 82 and the diode 214 and through voltage dividing resistors 216 and 218. The output of differential amplifier 202 is thereby applied to the base of an amplifying transistor 220. The amplifying transistor 220 is utilized to actuate another relay 222, to thereby provide an enabling signal to a load which serves as a signaling means. The enabling signal is provided through the armature 224 of the relay 222. Without the enabling signal the load connected to termination junctions 2 and 3 in the terminal block 37 will not be actuated. Thus, the light threshold detecting circuit 199 requires a sufficient level of ambient light above a threshold level determined by the wiper 85 on the resistor pot 212 before the relay 118 will be allowed to operate a signaling device connected to the load terminal junctions 2 and 3.

In the operation of the invention the indicator 10 is first positioned to view the area of interest. The lens assembly 22 is focused and the photoelectric sensors 24 and 26 are moved transversely by the adjusting screws 28 and 30 until their position is satisfactory as viewed through the eyepiece 72. The width of the viewing corridor is adjusted in this fashion in the manner described in association with FIGS. 1A and 1B.

Similarly, the length of the viewing corridor is likewise adjusted. The height of the adjusting foot 76 is altered by advancing or withdrawing the threaded shank thereof relative to the case 16 to adjust the tilt of the instrument 10, as depicted in FIGS. 1C and 1D.

With the viewing corridor defined, the outputs of the differential amplifiers 34 and 36 are normalized to produce a a no-reference output at the summing node 108. This is achieved by adjustment of the resistor pot wipers 38 and 40 in the lid 20 of the case 16.

Thereafter, any obstruction or intrusion into the field of view defined between that portion of the image projected on the screens 62 between the photoelectric sensors 24 and 26 will result in a different light level impinging upon the photoelectric sensors 24 and 26. The one of the photoelectric sensors 24 or 26 which thereafter receives a different level of illumination may be identified by the one of the LEDs 78 or 80 which is illuminated.

Any change from the differential amplifiers 34 and 36 from the reference level at the summing node 108 will result in actuation of the relay 118. If the switch 90 is in the position indicated in FIG. 5, the relay 118 will be actuated only as long as the output of the differential amplifiers 34 and 36 deviates from the reference or null level. If the mode selection switch 90 is in the opposite position, however, the timing circuit 140 will apply voltage to the signalling means connected to the load terminal junctions 2 and 3 for the time determined by the setting of the wiper 154 by post 92.

If the ambient light level is below a predetermined threshold set by the wiper 85 from outside of the case 16, operation of the relay 118 will not result in actuation of the signaling load connected to terminal junctions 2 and 3. This is because the relay 222 must also be actuated in response to an adequate light level to provide an operative signal to the load. Actuation of the relay 222 is evident by illumination of the LED 82 on the lid 20 of the case 16.

Undoubtedly, numerous other variations and modifications of the invention will become readily apparent to those familiar with photoelectric area surveillance systems. Accordingly, the scope of the invention should not be construed as limited to the specific embodiment depicted and described, but rather is defined in the claims appended hereto.

One modification which could be employed would be to reposition the eyepiece 72 to be directed downward behind the screens 62, and to include a tilted mirror positioned behind the screens 62 to reflect light upward into the eyepiece 72. In this way the user would be able to view the image between the photelectric sensors 24 and 26 which is included within the viewing corridor, rather than viewing an image of the portion of the field of view of the lens assembly 22 which lies beyond the viewing corridor. Other variations and modifications are also possible and are contemplated within the scope of the invention.

I claim:

1. An instrument for detecting changes in a viewing area of interest, comprising:
   a hollow, enclosed case,
   a lens mounted on said case and positioned to view an area including an area of interest and to project an image into said case,
   a track located in said case transverse to the direction of image projection from said lens,
   a pair of travelers independently moveable along said track,
   means for separately adjusting the position of each traveler on said track from outside of said case, separate photoelectric sensor means mounted within said case on each of said travelers, differential amplification means coupled to both of said photoelectric sensor means, means for defining a reference output from said differential amplification means, adjustable from outside of said case, and signaling means coupled to said differential amplification means and responsive to departure from said reference output of the output from said differential amplification means.

2. An instrument according to claim 1 wherein said means for defining a reference output includes independently adjustable gain amplifiers coupled to both of said photoelectric sensor means.

3. An instrument according to claim 1 further comprising a light threshold detecting means coupled to said signaling means to provide an enabling signal thereto in response to ambient light above an established threshold level.

4. An instrument according to claim 1 further comprising photosensor change indicator means coupled to said differential amplification means responsive to departure of said differential amplification means output from said reference output and operable to identify the photoelectric sensor causing said departure from said reference output.

5. An instrument according to claim 1 further comprising timing means coupled to said signaling means for operating said signaling means for a predetermined time period upon departure of said differential amplification means output from said reference output.

6. An instrument according to claim 5 further comprising mode selection means operable externally from said case and coupled to said timing means to selectively enable and disable said timing means.

7. A photoelectric device for defining a viewing corridor and comprising:
an enclosed, optically shielded case,
a lens mounted on said case to project a light level thereinto,
a pair of photoelectric sensors located in said case to receive light from said lens,
means adjustable from outside of said case for positioning said photoelectric sensors in said case in a plane transverse to the direction of light projection from said lens,
differential amplification means coupled to said photoelectric sensors to provide an output responsive to an input differential between said photoelectric sensors, and
signaling means coupled to said differential amplification means for indicating changes in the output thereof.

8. A photoelectric device according to claim 7 wherein said means for adjustably positioning said photoelectric sensors includes a pair of flat, light screens independently and laterally moveable in the focal plane of said lens and one of said photoelectric sensors is mounted on each of said screens and further comprising an eyepiece mounted on said case and directed toward said focal plane for observation of said screens to visually ascertain the boundaries of said viewing corridor.

9. A photoelectric device according to claim 7 wherein said means for adjustably positioning includes means for varying the lateral positions and spacing of said photoelectric sensors and further comprising means for tilting the longitudinal orientation of said lens to vary the length of said viewing corridor.

10. A photoelectric device according to claim 9 wherein said means for varying the lateral positions and spacing of said photoelectric sensors is operable to move each of said sensors independently of the other.

11. A photoelectric device according to claim 7 further comprising an ambient light level detector coupled as a threshold discriminator to said signaling means.

12. A photoelectric device according to claim 7 further comprising adjustment means coupled to normalize the output of said differential amplification means, and said adjustment means is operable from outside of said case.

* * * * *